United States Patent [19]

Pachins

[11] 3,895,490

[45] July 22, 1975

[54] CONTROL CIRCUIT FOR A PRESSURIZED FLUID ENGINE

[75] Inventor: Jean G. Pachins, Pavillons sous Bois, France

[73] Assignee: Societe Anonyme: Poclain, Le Plessis Belleville, France

[22] Filed: Feb. 13, 1974

[21] Appl. No.: 442,043

[30] Foreign Application Priority Data
Feb. 27, 1973 France .................. 73.06942

[52] U.S. Cl. ............... 60/486; 60/464; 91/16; 91/28; 91/436; 91/437; 91/441; 91/448; 91/450
[51] Int. Cl.² ............................. F16D 31/02
[58] Field of Search ........ 91/6, 16, 28, 30, 31, 436, 91/437, 441, 444, 448, 450, 466, 469; 60/484, 486, 464

[56] References Cited
UNITED STATES PATENTS

| | | | |
|---|---|---|---|
| 2,940,263 | 6/1960 | Cudnohufsky | 91/448 X |
| 3,018,902 | 1/1962 | Minty | 91/6 X |
| 3,375,756 | 4/1968 | Bienaime | 91/448 X |
| 3,452,397 | 7/1969 | Newton | 91/28 X |
| 3,480,091 | 11/1969 | Gyongyosi | 60/486 X |
| 3,636,708 | 1/1972 | Karman | 60/464 X |
| 3,744,244 | 7/1973 | Swoager | 60/464 X |
| 3,807,447 | 4/1974 | Masuda | 91/436 X |
| 3,835,647 | 9/1974 | Huffman | 91/6 X |

Primary Examiner—Martin P. Schwadron
Assistant Examiner—Abraham Hershkovitz
Attorney, Agent, or Firm—Fitzpatrick, Cella, Harper & Scinto

[57] ABSTRACT

A control circuit for a pressurized fluid engine comprising a first main conduit and a second main conduit for connection to a fluid engine, means for connection to a main source of pressurized fluid, means for connection to a return for non-pressurized fluid, a supply selector having at least two positions, which, in its first position, connects the first conduit to the main source connection means and the second conduit to the fluid return connection means and, in its second position, blocks the first and second main conduits at its position, means for connection to a secondary source of fluid, a secondary conduit connecting the secondary source connection means to the first main conduit, a non-return valve in the secondary conduit permitting passage of fluid from the secondary source connection means to the first main conduit, a distributor having two positions, arranged in the first and second main conduits, defining two separate portions of each of the main conduits and which, in its first position, places the two portions of each of the main conduits in communication and, in its second position, isolates the two portions of the respective main conduits from each other, a connection conduit which, in the second position of the distributor, connects those portions of the first and second main conduits to be connected to the engine, a discharge conduit which connects the connection conduit to non-return connection means, a main restriction in the discharge conduit, and a secondary restriction in the portion of the connection conduit between the union of the connection conduit to the first main conduit and to the discharge conduit.

7 Claims, 5 Drawing Figures

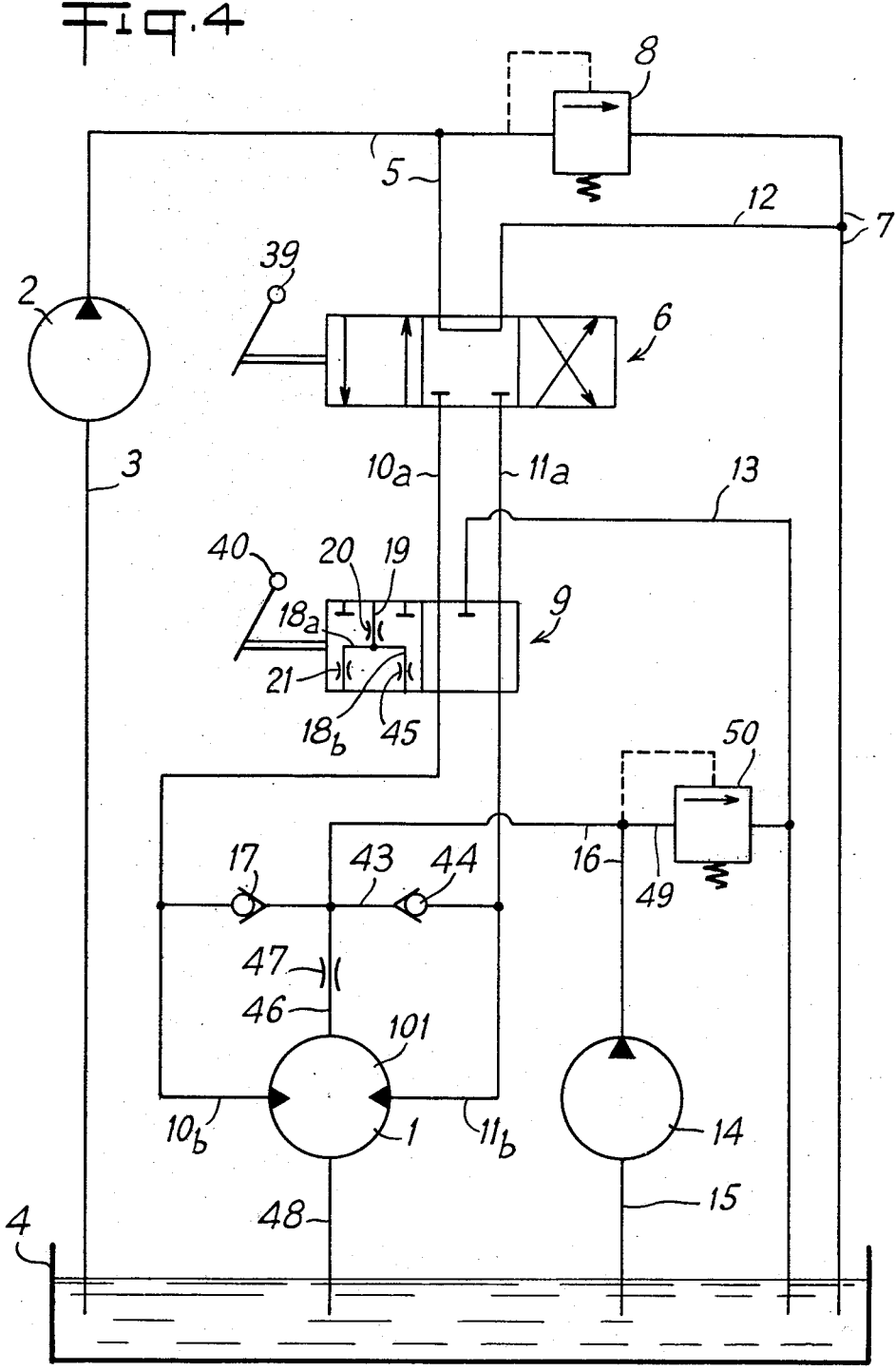

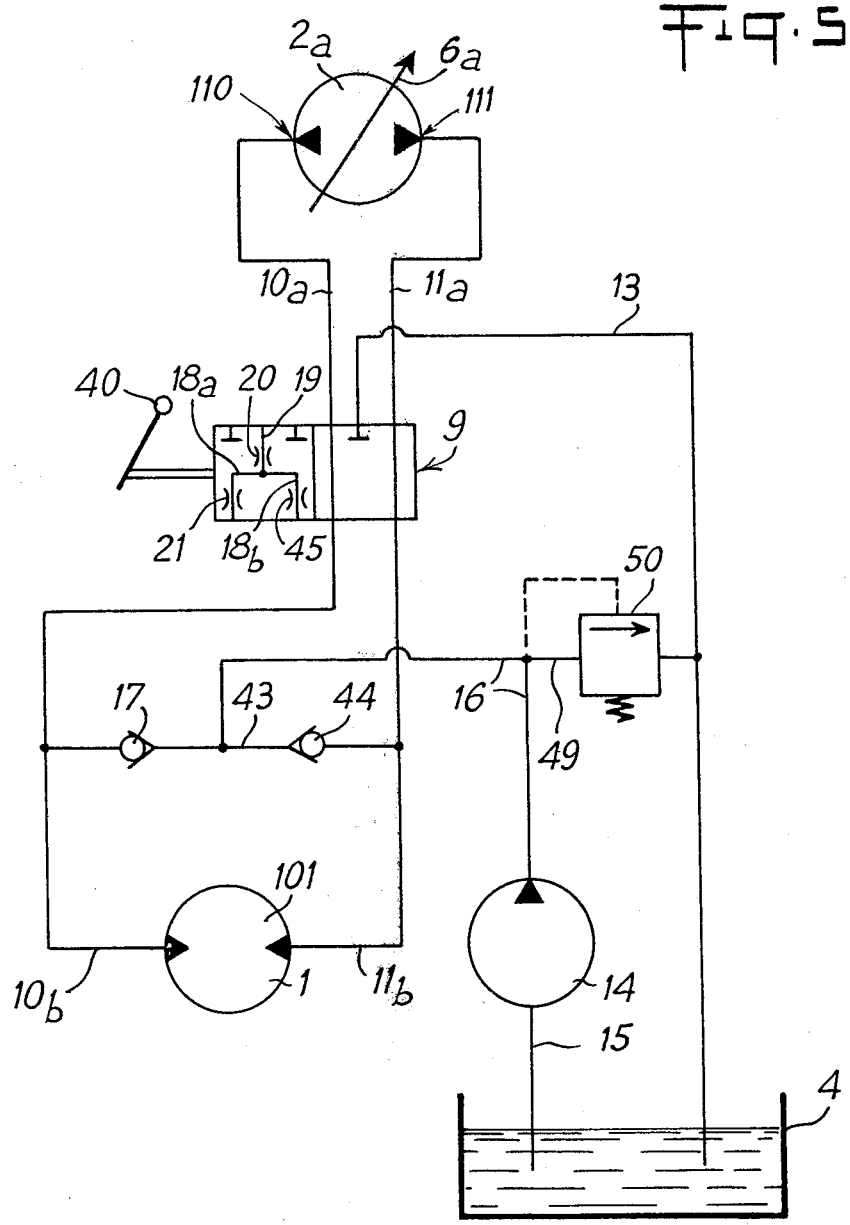

CONTROL CIRCUIT FOR A PRESSURIZED FLUID ENGINE

The present invention relates to improvements in control circuits for pressurized fluid engines.

The pressurized fluid supply of a fluid engine causes the rotation of the drive shaft and the driving of the load which is coupled to it. However, under certain operating conditions the drive shaft continues to rotate but, instead of driving the load, it is driven by this load. It is thus, for example, that the engines for driving the wheels of a vehicle are in fact, during descent of very steep slopes, often driven by the motion of the vehicle.

It will be appreciated that, under such circumstances, the delivery of the main supply pumps of the engines becomes insufficient to completely fill the induction chambers of these engines and that it is therefore necessary to provide a secondary source of fluid which enables the contribution of a supplementary fluid to be made. It is essentially a question of preventing the induction chambers from emptying and causing cavitation which is prejudicial to the good preservation of the various mechanical organs.

It may also be the question, in another manner of operation, of purely and simply wholly supplying with low or zero pressure fluid an engine which is momentarily driven by the load which is coupled to it but which, because it has a "free-wheeling" apparatus, is effectively in free wheel and is, in particular, isolated from the main fluid source. However, the pistons and other movable elements continue to move, which causes friction and the liberation of a certain amount of heat. As the engine is isolated from the main fluid source, it becomes necessary to lubricate and cool it with a flow of secondary fluid, which can again be taken simply from the secondary source.

Taking into account the fact that, on this occasion, the flow is equal to the total flow drawn in by the engine and therefore has a high value, it is appropriate to reduce to the greatest possible extent the value of the flow of effectively cooled fluid which will be injected into the engine intake, in order to limit pressure losses in the said circuit and consequently to limit the losses of power and efficiency resulting from the said pressure losses. It is therefore a question of removing from the delivery conduit of the engine a small portion of the total hot flow which has passed through this engine and for concomitantly injecting into the supply conduit of the said engine a flow of cooled fluid equal in value to the hot flow removed. It is understood that by 'cooled' fluid is meant only a fluid having a lower temperature than the fluid delivered by the engine, after the said fluid has passed through the known cooling apparatus arranged in any plant employing a pressurized fluid.

According to the present invention there is provided a control circuit for a pressurized fluid engine comprising a first main conduit and a second main conduit for connection to a fluid engine, means for connection to a main source of pressurized fluid, means for connection to a return for non-pressurized fluid, a supply selector having at least two positions, which, in its first position, connects the first conduit to the main source connection means and the second conduit to the fluid return connection means and, in its second position, blocks the first and second main conduits at its position, means for connection to a secondary source of fluid, a secondary conduit connecting the secondary source connection means to the first main conduit, a non-return valve in the secondary conduit permitting passage of fluid from the secondary source connection means to the first main conduit, a distributor having two positions arrangend in the first and second main conduits, defining two separate portions of each of the main conduits and which, in its first position, places the two portions of each of the main conduits in communication and, in its second position, isolates the two portions of the respective main conduits from each other, a connection conduit which, in the second position of the distributor, connects those portions of the first and second main conduits to be connected to the engine, a discharge conduit which connects the connection conduit to non-return connection means, a main restriction in the discharge conduit, and a secondary restriction in the portion of the connection conduit between the union of the connection conduit to the first main conduit and to the discharge conduit.

If the fluid engine is of the reversible type, the selector may have a third position, in which the first main conduit is connected to the fluid return and the second main conduit is connected to the main source. Another secondary conduit connects the secondary source to the second main conduit, another non-return valve being arranged in this other secondary conduit and permitting passage of fluid from the secondary connection means to the second main conduit. Lastly, another secondary restriction is arranged in the portion of the connection conduit between the union of the connection conduit to the second main conduit and to the discharge conduit.

The movable elements of the supply selector and the distributor may be interconnected so as to place the selector and distributor concomitantly either in their first respective positions or in their second respective positions.

If the circuit is of the "open" type, a discharge reservoir is provided and the selector consists of a distributor having at least two positions, which is connected to the main source connection means, to the discharge reservoir and to the first and second main conduits.

If the circuit is of the "closed" type, a main fluid source is provided with means for adjusting its delivery flow-rate, and optionally the delivery direction, the supply selector consisting of the flow-rate adjustment organ.

The invention will be more fully understood from the following description of embodiments thereof, given by way of example only, with reference to the accompanying drawings, in which:

FIG. 4 is a diagrammatic illustration of a control circuit, also of the open type, in accordance with the invention, of a reversible hydraulic engine; and FIG. 5 is a diagrammatic illustration of a control circuit of the closed type, in accordance with the invention, of a reversible hydraulic engine.

Figure 1:
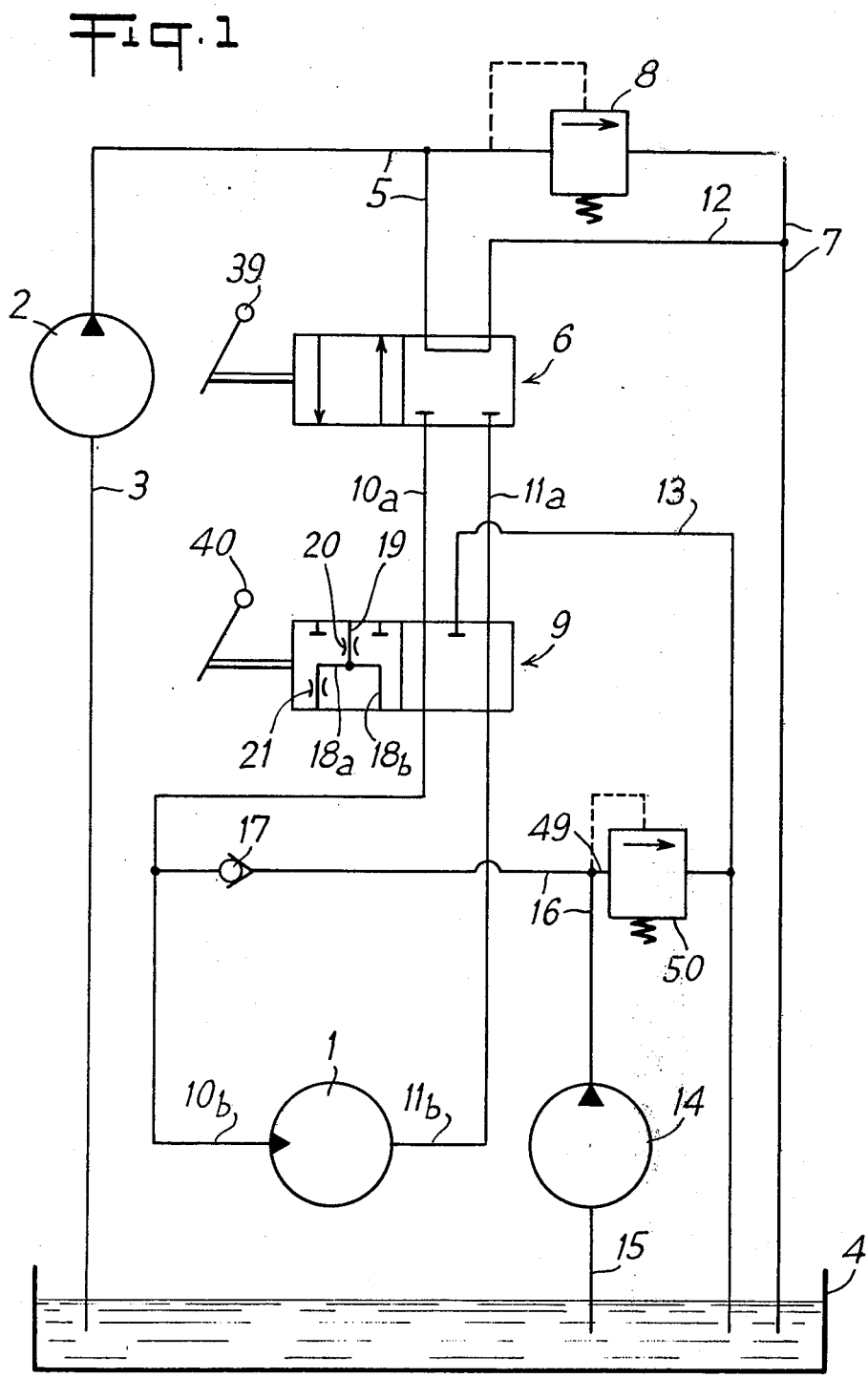
FIG. 1 is a diagrammatic illustration of a control circuit of the open type, in accordance with the invention, of an hydraulic engine having a single direction of rotation.

The control circuit shown in FIG. 1 is for an engine 1 with a single direction of rotation. A pump 2 is connected by its induction conduit 3 to a reservoir 4 and by its delivery conduit 5 to a main distributor 6 having two positions. It will be noted that, in known manner, a conduit 7 is provided as a by-pass to the delivery conduit 5, which it connects to reservoir 4, a calibrated discharge valve 8 being arranged in this conduit 7.

A second or secondary distributor 9 having two positions is connected to the main distributor 6 by conduits 10a and 11a, and to the engine 1 by conduits 10b and 11b, conduits 10a and 10b in fact forming the supply conduit of the engine 1 and the conduits 11a and 11b forming the delivery conduit of the engine 1. A conduit 12 connects the distributor 6 to the conduit 7, downstream of the discharge valve 8 relative to the connection of this conduit 7 to the conduit 5. A conduit 13 connects the distributor 9 to the reservoir 4.

A secondary fluid source is provided by a pump 14 which is connected by its induction conduit 15 to the reservoir 4 and by its delivery conduit 16 to the conduit 10b. A non-return valve 17 is provided in the conduit 16 and arranged to permit passage of fluid from pump 14 to the conduit 10b. A conduit 49 is provided as a by-pass to the conduit 16 and is connected to the conduit 13, a calibrated discharge valve 50 being arranged in conduit 49.

The distributor 9 has a connection conduit in two portions 18a and 18b, which are connected to each other and both are connected to a discharge conduit 19. A main restriction 20 is arranged in the discharge conduit 19, and a secondary restriction 21 is arranged in conduit 18a.

The positions of the two distributors are as follows:
in the first position of the distributor 6 conduits 5 and 10a and 11a and 12 are placed in communication;
in the second position of the distributor 6 conduits 5 and 12 are placed in communication and conduits 10a and 11a are blocked at the distributor;
in the first position of the distributor 9 conduits 10a and 10b and 11a and 11b are placed in communication and the conduit 13 is blocked at the distributor; and
in the second position of the distributor 9 conduits 10b and 18a, 11b and 18b and 19 and 13 are placed in communication and conduits 10a and 11a are blocked at the distributor.

Figure 2:
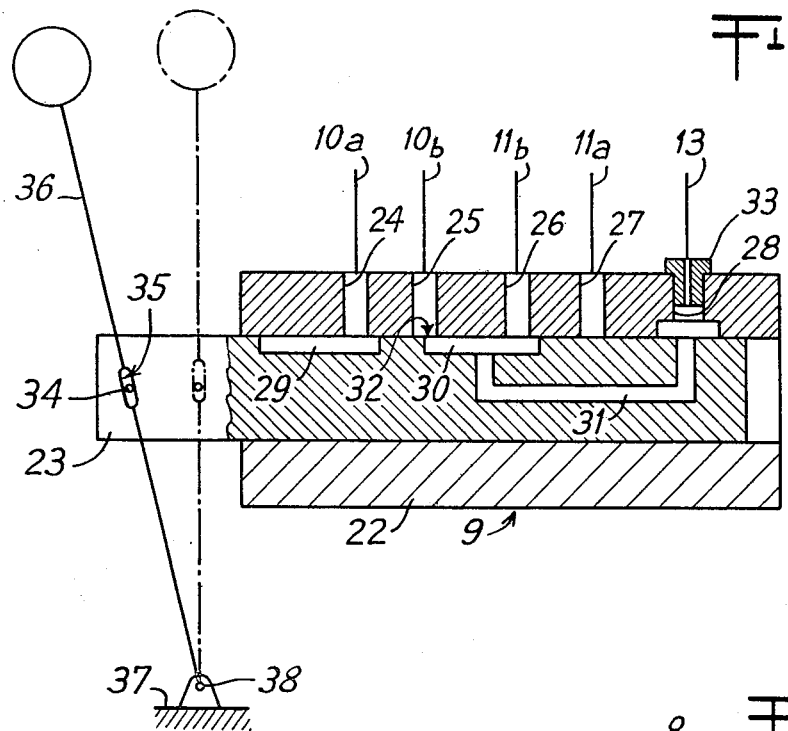
FIG. 2 is an axial section through the secondary distributor of the circuit of FIG. 1.

FIG. 2 shows an axial section of the distributor 9 which comprises a body 22 inside which a slide-valve 23 is slidably mounted. The conduits 10a, 10b, 11b, 11a and 13 are again shown, connected at unions 24, 25 26, 27 and 28 respectively of the body 22. The slide-valve 23 is provided with two grooves 29 and 30, whose dimensions in the direction of sliding are such that, in the first position of the slide-valve, the unions 24 and 25 open entirely in groove 29 and the unions 26 and 27 open entirely in groove 30, the union 28 being blocked by the slide-valve 23. In the second position of the slide valve 23 (shown in FIG. 2), only the union 24 emerges in the groove 29, the union 25 emerges partially in the groove 30, the union 26 emerges entirely in the groove 30, and the union 28 is arranged opposite a conduit 31, formed in the slide-valve 23 and connected to the groove 30.

In this second position of the slide-valve 23, the union 25 in fact emerges opposite an edge 32, which defines an end of the groove 30, so that the passage formed between the said union 25 and the said edge 32 in fact forms the secondary restriction 21. It will be noted that the main restriction 20 is here formed by the calibrated orifice of a member 33 fixed in the union 28. Conduits 18a, 18b and 19 of FIG. 1 are formed respectively by the union 25 and the groove 30, the union 26 and the groove 30, and the conduit 31 and the union 28. The slide-valve 23 has a shaft 34 which is introduced into the eye 35 of a lever 36. This lever 36 is pivoted on the frame 37 of the apparatus supporting the body 22 for pivotal movement about an axis 38 and this is done in a manner which is well known.

Figure 3:
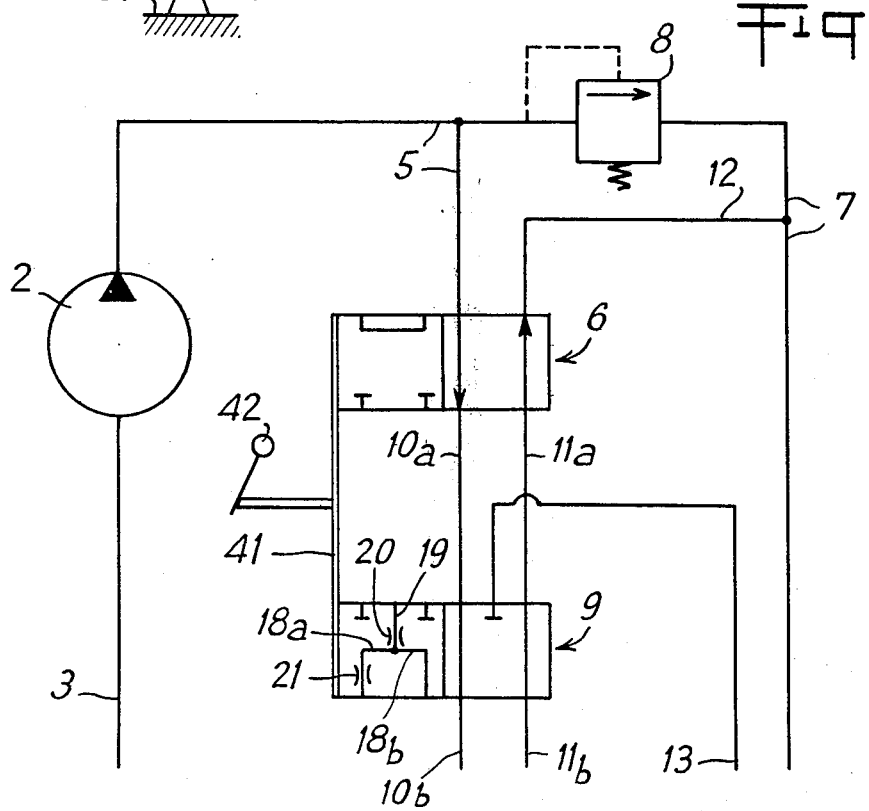
FIG. 3 is a diagrammatic illustration of a modification of the circuit of FIG. 1.

The distributors 6 and 9 of FIG. 1 are each provided with a separate control 39, 40. It is, however, sometimes advantageous to couple the controls of the two distributors. The modification of FIG. 3 may then be adopted, in which the various abovementioned elements are used, except for controls 39 and 40. In the modification of FIG. 3, the movable elements of the distributors 6 and 9 are rigidly attached to a common rigid linkage 41 which is provided with the single control 42. As a result of this arrangement, the first position of the distributor 6 corresponds to the first position of the distributor 9 and the second position of the distributor 6 corresponds to the second position of the distributor 9.

When the hydraulic engine is a reversible engine, such as the engine 101 of FIG. 4, it is necessary to complete the circuit of FIG. 1 in the manner shown in FIG. 4. Thus a conduit 43 connects the portion of the conduit 16 between the pump 14 and the non-return valve 17 to the conduit 11b, another non-return valve 44 being arranged in this conduit 43 to permit passage of fluid from the conduit 16 to the conduit 11b. Another secondary restriction 45 is arranged in the conduit 18b.

The distributor 6 is provided with a third position in which it places the conduits 5 and 11a and 10a and 12 in communication to direct fluid delivered under pressure by pump 2 into the conduit 11a to supply the motor 101 through the conduit 11b. In this way, the engine 101 may be rotated in a direction opposite to the direction of rotation corresponding to the first position of the distributor 6.

The engine 101 shown in FIG. 4 has a reheating circuit which in this particular case consists of a fluid intake conduit 46 and a fluid evacuation conduit 48 connected to the reservoir 4. The conduit 46 is connected to the portion of the conduit 16 between the pump 14 and the non-return valve 17, and a complementary restriction 47 is arranged in this conduit 46. The reheating circuit, itself well known, passes through the engine casing to enable fluid emanating from the conduit 16 to bathe the various elements of said engine which, when the engine is temporarily stopped, enables these various organs to be maintained at the operating temperature and consequently makes it possible to start the engine immediately without fear of thermal shock. Of course, as shown, such a circuit is distinct from the main supply or pressurised circuits.

The circuit of FIG. 5 is similar to that of FIG. 4, the same elements being referred to by the same references. The main difference resides in the replacement of the pump 2 of FIG. 4 by a pump 2a provided with means 6a for adjustment of the value and direction of its delivery. The means 6a has a function similar to that of the distributor 6 as regards the operation of the circuit. The conduits 10a and 11a then respectively connect the main unions 110 and 111 of the pump 2a to the distributor 9. The pump 2a may be of a known type with pistons having parallel axes arranged in a piston-chamber and with an inclinable plate for adjusting the delivery flow-rate.

To simplify FIG. 5, the conduits 46 and 48 and the restriction 47 have been omitted as compared with FIG. 4.

The operation of the circuits which have been described will now be explained.

As regards the circuit of FIG. 1, an examination will be made of the four possible configurations.

The first configuration corresponds to the first positions of each of the distributors 6 and 9. The pressurized fluid delivery by the pump 2 into the conduit 5 is conveyed in the conduits 10a and 10b, while the fluid delivered by the engine 1 returns to the reservoir 4 through the conduits 11b, 11a, 12 and 7. The engine 1 is effectively supplied by the conduit 10b, it being understood that the fluid contained in this conduit 10b cannot escape to the pump 14, since the non-return valve 17 blocks this path. However, if it happens that the flow delivered by the pump 2 is insufficient to completely supply the motor 1, a complement of fluid, which is at low pressure, will be contributed by the pump 14, which delivers into the conduit 16 through the non-return valve 17. Finally, if the delivery of the pump 14 is much in excess, it will be partially returned to the reservoir 4 through the conduits 49 and 13 via the discharge valve 50 which will open for this purpose. It may be noted that if, in the embodiment shown, the pump 14 forms a source of high pressure fluid, it is possible, by way of modification, to effect pressurized filling by arranging a check-valve with a low setting in a return conduit to the reservoir and by connecting the apparatus, here the engine 1, to the said return conduit upstream of the check-valve.

The second configuration corresponds to the second position of the distributor 6 and to the first position of the distributor 9. The fluid delivered by the pump 2 into the conduit 5 then returns to the reservoir 4 through the conduits 12 and 7. As both the supply and delivery conduits 10a and 11a of the engine 1 are blocked at the distributor 6, the engine 1 is stopped. The pump 14 returns the delivered fluid to the reservoir 4 through the conduits 49 and 13, via the discharge valve 50.

In the third configuration in which the two distributors 6 and 9 are in their second positions, fluid delivered by the pump 2 continues to return to the reservoir 4 through the conduits 5, 12 and 7. On the other hand, the engine 1 may be driven by the load which is coupled to it, may be provided with a "free-wheeling" apparatus and may be placed in this free-wheel condition. Under these circumstances, the engine 1 continues to draw in fluid in the conduit 10b. Fluid delivered to the conduit 11b can only return to the reservoir 4 through the conduits 18a, 19 and 13, and passing through the main restriction 20. This restriction 20 forms an effective obstacle to free return of the fluid to the reservoir 4, so that a portion of the fluid from the conduit 11b passes through the restriction 21 in conduit 18a and is again directed into the conduit 10b.

This recycled fluid is relatively hot while, however, having an insufficient flow-rate to completely supply the engine 1. It is therefore necessary to have a complementary contribution of fluid which must be a cooled fluid. This contribution is provided by the pump 14 which delivers fluid into the conduits 16 and 10b, through the non-return valve 17. It will be noted that the presence of the restriction 20 prevents the whole of the fluid of the conduit 11b from returning to the reservoir 4, just as that of the restriction 21 prevents the fluid of the conduit 10b from being directed to the conduit 19, the pressure loss created by the restriction 21 maintaining a pressure in the conduit 18a greater than that in the conduit 10b. Therefore, the arrangement adopted permits a given recycling of the fluid which has already done work, which avoids renewing the whole of this fluid and conveying a high flow-rate of fluid into the conduits, which arrangement is the cause of considerable pressure losses. Consequently, the efficiency obtained is high. Only the quantity of fluid necessary to maintain the optimal temperature in the conduit 10b has been renewed. By adjusting the value of the main restriction 20, it is possible to adjust the quantity of hot fluid evacuated and the value of the quantity of cooled fluid admitted is consequently adjusted.

Lastly, in the fourth configuration, the distributor 6 is arranged in its first position, while the distributor 9 is arranged in its second position. From the point of view of operation, this configuration is similar to the third configuration since the fluid delivered by the pump 2 and conveyed in the conduits 5 and 10a is stopped at the distributor 9.

It may be, of course, that there is never any need to immobilize the engine 1. Under these circumstances, the second configuration described above is useless. Furthermore, as the fourth configuration leads to an operation similar to that of the third configuration, it is only necessary for the first and third configurations mentioned to be obtainable. Advantage may be taken of this situation to simplify the control of the distributors 6 and 9 and link the latter to a single control organ 42, as shown in FIG. 3.

Lastly, in the case of a reversible engine, such as the engine 101 of FIG. 4, taking into account the symmetry of operations in the two directions of rotation, the conduit 43 and the non-return valve 44 are provided to effect the required contribution of cooled fluid into the conduit 11b, which then conveys the fluid drawn in by the engine 101. Similarly, it is necessary to arrange the restriction 45 in the conduit 18b. It may be noted that, for example, when the fluid delivered by the engine 101 is conveyed in the conduit 10b, the existence of three pressure levels is established, namely a first pressure in the conduit 10b; a second pressure in the portions of the conduits 18a and 18b connected to the conduit 19, which is lower than the first pressure due to the pressure drop caused by the passage of the fluid of conduit 10b to the conduit 19 through the restriction 21, and a third pressure in the conduit 11b, which is lower than the second pressure due to the pressure drop caused by the passage of the fluid of the conduit 18b to the conduit 11b through the restriction 45. These pressure levels ensure satisfactory circulation of the fluid in the circuit. As above, adjustment of the main restriction 20 enables the temperature of the fluid passing through the engine 101 to be maintained at the required optimal value.

It should be noted that, if selection of the value of the restriction 20 has been correctly effected, that of the restrictions 21 and/or 45 does not have to be set meticulously. It is sufficient for a small pressure drop to be caused, without its absolute value being determining. For this reason, in the embodiment of FIG. 2, if the orifice of the union 33 is calibrated, the passage between the edge 32 and the union 25 may have any value and need not be very precise, taking into account the relatively approximate position of the slide-valve 23 in the body 22.

In the embodiment of FIG. 4, when the engine 101 is stopped, it is heated in known manner by the conduit 46, connected for this purpose to the delivery conduit 16 of the pump 14. The restriction 47 is arranged in the conduit 46 to prevent the fluid of conduit 16 returning freely to the reservoir 4 via the conduits 46 and 48 and through the engine 101.

The circuit of FIG. 5 obviously operates in a similar manner to that of FIG. 4 as regards the action of restrictions 20, 21 and 45. The adjustment means 6a permits adjustment of the value of the delivery of the pump 2a from a zero value to a maximum value, and the direction of this delivery either to union 110 or to union 111, in known manner. As a result, the adjustment means 6a has a similar function to that of the distributor 6 of the circuit shown in FIG. 4.

The invention is not limited to the embodiments which have been described, but on the contrary covers all the modifications which could be made to them without departing from their spirit or scope.

What is claimed is:

1. Control circuit for a pressurized fluid engine comprising:
   a first main conduit and a second main conduit for connection to the fluid engine;
   means for connection to a main source of pressurized fluid;
   means for connection to a return for non-pressurized fluid;
   a supply selector having at least two positions, which, in its first position, connects said first conduit to said main source connection means and said second conduit to said fluid return connection means and, in its second position, blocks said first and second main conduits at its position;
   means for connection to a secondary source of pressurized fluid;
   a secondary conduit connecting said secondary source connection means to said first main conduit;
   a non-return valve in the said secondary conduit permitting passage of fluid from said secondary source connection means to said first main conduit;
   a distributor having two positions, arranged in said first and second main conduits, defining two separate portions of each of said main conduits, and which, in its first position, places said two portions of each of said main conduits in communication and, in its second position, isolates said two portions of each said respective main conduit from each other;
   a connection conduit which, in the second position of the distributor, connects those of said portions of said first and second main conduits to be connected to the engine;
   a discharge conduit which connects said connection conduit to a return connection means;
   a main restriction in said discharge conduit; and
   a secondary restriction in the portion of said connection conduit between the union of said connection conduit to said first main conduit and to said discharge conduit.

2. A circuit in accordance with claim 1 for a reversible fluid engine, wherein said selector has a third position in which said first main conduit is connected to said fluid return connection means, and said second main conduit is connected to said main source connection means, and another secondary conduit connects said secondary source connection means to said second main conduit, a non-return valve being arranged in said other secondary conduit and permitting passage of fluid from said secondary source connection means to said second main conduit, and a secondary restriction is provided in the portion of said connection conduit between the union of said connection conduit to said second main conduit and to said discharge conduit.

3. A circuit in accordance with claim 1, wherein the movable elements of said supply selector and of said distributor are linked to each other such that said selector and said distributor are concomitantly placed either in their first respective positions or in their second respective positions.

4. A circuit in accordance with claim 1 of the open type, including a discharge reservoir connected to said return connection means, and wherein said selector consists of a distributor having at least two positions and which is connected to said main source connection means, to said discharge reservoir and to said first and second main conduits.

5. A circuit in accordance with claim 1 of the closed type, including a main fluid source provided with means for adjusting its delivery flow-rate, and optionally the direction of this delivery, the supply selector consisting of said delivery adjustment means.

6. A circuit in accordance with claim 2 of the open type, including a discharge reservoir connected to said return connection means, and wherein said selector consists of a distributor having at least two positions and which is connected to said main source connection means, to said discharge reservoir and to said first and second main conduits.

7. A circuit in accordance with claim 2 of the closed type, including a main fluid source provided with means for adjusting its delivery flow-rate, and optionally the direction of this delivery, the supply selector consisting of said delivery adjustment means.

* * * * *